US012028421B2

(12) United States Patent
McDougall et al.

(10) Patent No.: US 12,028,421 B2
(45) Date of Patent: Jul. 2, 2024

(54) METHODS AND SYSTEMS FOR FAST ACCOUNT SETUP

(71) Applicant: Apple Inc., Cupertino, CA (US)

(72) Inventors: Michael McDougall, San Francisco, CA (US); Steve S. Ko, Los Altos, CA (US); John William Scalo, Santa Cruz, CA (US); Patrick L Coffman, San Francisco, CA (US); Aaron Matthew Everitt, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 867 days.

(21) Appl. No.: 16/430,769

(22) Filed: Jun. 4, 2019

(65) Prior Publication Data

US 2019/0289093 A1 Sep. 19, 2019

Related U.S. Application Data

(62) Division of application No. 14/861,937, filed on Sep. 22, 2015, now Pat. No. 10,341,460, which is a
(Continued)

(51) Int. Cl.
*G06F 15/16* (2006.01)
*G06F 21/45* (2013.01)
*H04L 67/01* (2022.01)
*H04L 67/10* (2022.01)
*H04L 67/306* (2022.01)
*H04L 67/561* (2022.01)
*H04L 67/567* (2022.01)

(52) U.S. Cl.
CPC ............ *H04L 67/306* (2013.01); *G06F 21/45* (2013.01); *H04L 67/01* (2022.05); *H04L 67/10* (2013.01); *H04L 67/561* (2022.05); *H04L 67/567* (2022.05)

(58) Field of Classification Search
CPC ... H04L 67/306; H04L 67/10; H04L 67/2804; H04L 67/2838; H04L 67/42; H04L 67/1002; G06F 12/45; G06F 11/1453; G06F 11/2089; G06F 11/2083
USPC ........................................................ 709/203
See application file for complete search history.

(56) References Cited

U.S. PATENT DOCUMENTS 7,831,441 B1 11/2010 Juneau et al.
7,877,325 B2 1/2011 Bishop et al.
(Continued)

FOREIGN PATENT DOCUMENTS

WO WO2009129337 A1 10/2009

*Primary Examiner* — Yves Dalencourt
(74) *Attorney, Agent, or Firm* — Womble Bond Dickinson (US) LLP

(57) ABSTRACT

Methods and systems are provided for collecting, storing, and transmitting account information in a matchable form, and for using this information to quickly set up accounts. Account information is maintained and shared between one or more client devices and an intermediate server. Account information can be reconciled locally to determine whether to add or enable an active account or an account proxy to a client device. Account proxies can be quickly enabled by a single user action. The methods and systems allow enabled accounts and account proxies to be removed from a first client device without propagating the deletion to a second client device.

14 Claims, 12 Drawing Sheets

Related U.S. Application Data division of application No. 13/646,621, filed on Oct. 5, 2012, now Pat. No. 9,160,816.

(60) Provisional application No. 61/594,327, filed on Feb. 2, 2012.

(56) References Cited

U.S. PATENT DOCUMENTS

| | | | |
|---|---|---|---|
| 7,921,089 B2 | 4/2011 | Kailash et al. | |
| 7,945,512 B2 | 5/2011 | Scipioni et al. | |
| 8,327,428 B2 * | 12/2012 | Bailey | G06F 21/31 |
| | | | 713/168 |
| 2005/0165884 A1 | 7/2005 | Masek | |
| 2007/0078785 A1 | 4/2007 | Bush et al. | |
| 2008/0104239 A1 | 5/2008 | Lipinski | |
| 2010/0042847 A1 * | 2/2010 | Jung | G06F 21/43 |
| | | | 713/183 |
| 2010/0146601 A1 | 6/2010 | Bunch | |
| 2011/0302077 A1 | 12/2011 | Lundgren | |
| 2012/0284776 A1 * | 11/2012 | Sundaram | H04L 67/10 |
| | | | 726/4 |
| 2013/0007167 A1 | 1/2013 | Smith et al. | |
| 2015/0295966 A1 | 10/2015 | Wong | |
| 2021/0006518 A1 * | 1/2021 | Karp | H04L 51/02 |

* cited by examiner

| Key | Value |
|---|---|
| Devices | DeviceID1, DeviceID2, DeviceID3 |
| DeviceID1 | AccountHash1, AccountHash3 |
| DeviceID2 | AccountHash1, AccountHash2 |
| DeviceID3 | AccountHash2, AccountHash3 |
| AccountHash1 | Details of Account 1 |
| AccountHash2 | Details of Account 2 |
| AccountHash3 | Details of Account 3 |

FIG. 2

| Key | Value |
|---|---|
| Devices | DeviceID1, DeviceID2, DeviceID3 |
| DeviceID1 | AccountHash3 |
| DeviceID2 | AccountHash1, AccountHash2 |
| DeviceID3 | AccountHash2, AccountHash3 |
| AccountHash1 | Details of Account 1 |
| AccountHash2 | Details of Account 2 |
| AccountHash3 | Details of Account 3 |

FIG. 5

| Key | Value |
| --- | --- |
| Devices | DeviceID1, DeviceID2, DeviceID3 |
| DeviceID1 | AccountHash3 |
| DeviceID2 | AccountHash2 |
| DeviceID3 | AccountHash2, AccountHash3 |
| AccountHash2 | Details of Account 2 |
| AccountHash3 | Details of Account 3 |

FIG. 6

| Key | Value |
|---|---|
| Devices | DeviceID2, DeviceID3 |
| DeviceID2 | AccountHash1, AccountHash2 |
| DeviceID3 | AccountHash2, AccountHash3 |
| AccountHash1 | Details of Account 1 |
| AccountHash2 | Details of Account 2 |
| AccountHash3 | Details of Account 3 |

FIG. 7

METHODS AND SYSTEMS FOR FAST ACCOUNT SETUP

This application is a divisional of co-pending U.S. application Ser. No. 14/861,937 filed on Sep. 22, 2015, which is a divisional of U.S. application Ser. No. 13/646,621 filed on Oct. 5, 2012, now issued as U.S. Pat. No. 9,160,816, which claims the benefit of U.S. Provisional Patent Application No. 61/594,327, filed Feb. 2, 2012, and this application hereby incorporates herein by reference that provisional patent application.

BACKGROUND OF THE INVENTION

In today's mobile world, it is commonplace for people to own multiple devices for different purposes. For example, users may have a desktop computer for work, a laptop computer for home use, and a mobile phone for both work and home use. Similarly, a user may have a collection of accounts with different purposes. For example, a user may have accounts for email, contacts, and calendars related to both home and work use.

The user may want the ability to maintain the same account on multiple devices. For example, a user may want a work calendar account to be maintained on both the desktop computer and the mobile device. Various data synchronization methods can be employed to ensure that changes made to an account on one device propagate to a separate device. For example, changes made to an account on one device can be communicated with an intermediate server that uses push functions to synchronize the data onto another device. These methods typically seek to maintain the same account state on all devices. However, prior to synchronizing, each device must be connected with the intermediate server and each account must be added to the devices individually through a setup process. This connection and account setup process typically requires manual intervention by a user and can be onerous.

Furthermore, a user may prefer to change account arrangements on different devices. For example, after adding and synchronizing an account on multiple devices, a user may subsequently wish to remove the account from only one device. For example, a user may purchase a new mobile phone dedicated to work and thereafter repurpose the original mobile phone for strictly personal use. As a result, the user may want to remove the work calendar account from the original mobile phone. Under existing data synchronization methods, if the user removes the work calendar account from the original mobile phone, this account deletion propagates to delete the account from the intermediate server and the desktop computer. Thus, the work calendar will need to be set up again on the relevant devices using the same tedious setup procedure mentioned above.

SUMMARY OF THE DISCLOSURE

An aspect of the systems and methods disclosed relates to allowing users with a collection of accounts to quickly and easily enable those accounts on one or more devices. The systems and methods also allow a user to remove an account from one device without removing the account from a different device.

In an embodiment, the systems and methods include storing account information pertaining to each account on both a device and an intermediate server, such as one or more servers in a cloud based account management system. In the embodiment, when the device accesses accounts locally or receives notifications from the intermediate server, a process is launched to collect account information from both the device and the intermediate server. The account information can be, for example, an email address, and optionally a password, and other data needed to setup the email account. This information can be, for example, hashed to a key to allow its efficient retrieval. The account information from the local device and the intermediate server are reconciled on the device. Any new account information can be used to update existing account information or to create a proxy for a new account on the device. Account proxies can be enabled into active accounts quickly through a brief user interaction, e.g., by entering a password and selecting a button or by simply selecting a button. Furthermore, reconciled account information can be propagated to the intermediate server to update the account information stored on the intermediate server for future retrieval by the same device or a different device.

In an embodiment, the systems and methods include notifying a second client device indicating that new information resides on the intermediate server. For example, an account may have been enabled or an account proxy added to a first client device. Upon enabling or adding the account proxy information to the first client device, information pertaining to the account on the first client device is updated on the server, resulting in an update to the information on the server. Subsequently, a notification can be sent to the second client device from the intermediate server. In response to the notification event, the second client device can determine the nature of the new information through, e.g., a daemon process, which can query the intermediate server for the new information. Thus, the notification can trigger operations on the second client device that result in appropriate account related actions, e.g., adding an account, updating information related to an account, or adding an account proxy.

In an embodiment, a same account can reside on two separate client devices. Furthermore, account information related to this account can be stored on an intermediate server that communicates with both client devices. Thus, identifying account information related to the account stored on the server for the first device will match identifying account information stored on the server for the second device. However, removal of an account from one device may not, in an embodiment, result in removal of the account information stored on the server for the other device. Furthermore, the account removed from one device may remain on the other device.

In an embodiment, account information from a local system and a server can be reconciled by a client device. Account information can be collected from both the local system and the server. This account information can be related to the same account, but it may differ to a degree. For example, the account information can have non-identifying information, such as a user-provided account name, which may differ between the account information found on the local system and the account information found on the server. The non-identifying information can also include information related to account creation, such as timestamps associated with account creation, which can enable policies to determine which account information is controlling. For example, the account information stored on the client device and server can be updated to reflect the non-identifying account information associated with a most recent timestamp. The client device can also record information about user actions with respect to accounts. For example, the client device can locally store information related to account deletions.

The systems and methods introduced here provide numerous aspects related to adding and updating accounts. In one aspect, the systems and methods allow for accounts to be easily added to multiple devices with minimal user interaction. In another aspect, the systems and methods allow for removal of an account from a first device without interfering with the arrangement of accounts on a different device. In yet another aspect, the systems and methods accommodate users who want a different collection of accounts on different devices. Additional features of the present invention will be apparent from the accompanying drawings and from the detailed description which follows.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements.

FIG. 2 is a table illustrating an implementation of a data structure for storing account information in accordance with an embodiment of the present invention.

FIG. 5 is a table illustrating an implementation of a data structure for storing account information in accordance with an embodiment of the present invention.

FIG. 6 is a table illustrating an implementation of a data structure for storing account information in accordance with an embodiment of the present invention.

FIG. 7 is a table illustrating an implementation of a data structure for storing account information in accordance with an embodiment of the present invention.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the United States Patent and Trademark Office file or records, but otherwise reserves all copyrights whatsoever.

Figure 1:
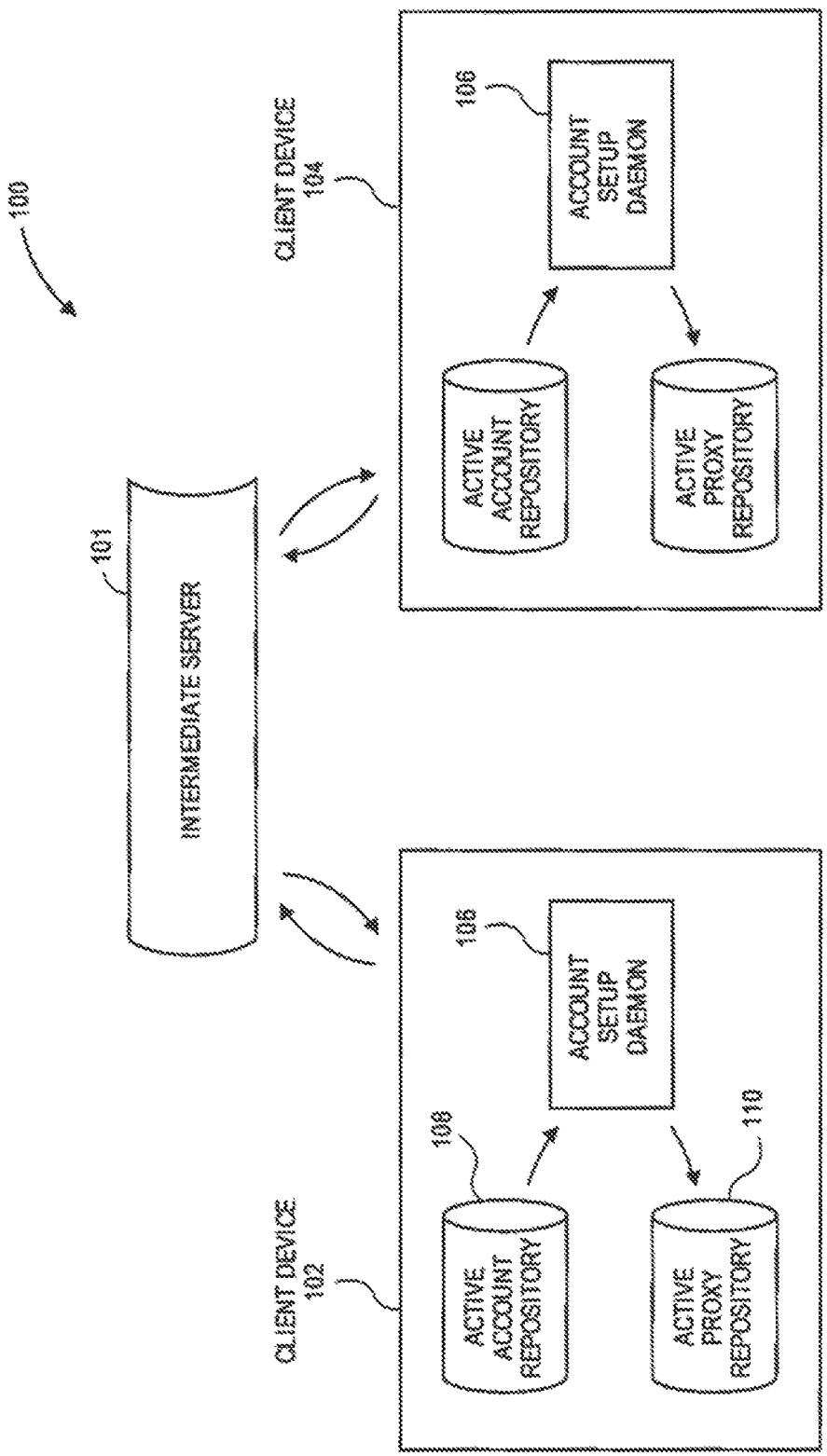
FIG. 1 is a block diagram illustrating pertinent components of a system in accordance with an embodiment of the present invention.

Referring now to FIG. 1, a block diagram illustrating pertinent components of a system is shown in accordance with an embodiment of the present invention. As shown, system 100 can include one or more client devices 102, 104 and an intermediate server 101. Client devices 102, 104 can be configured to connect with intermediate server 101 over a network such as the Internet. Client devices 102 and 104 are shown as a network of multiple client devices, but it will be appreciated that more than two client devices can be configured to communicate with intermediate server 101, and indeed, multiple intermediate servers can be used to communicate with several of those devices. Each client device 102, 104 in the system can include a processing system to enable the performance of the following methods. An embodiment of such a processing system incorporated in a client device is described below.

An account setup daemon 106 can be launched under various circumstances to perform account-related tasks. In an embodiment, account setup daemon 106 can be launched by an account setup application that exists on the client device 102. For example, an account setup application on client device 102 can launch account setup daemon 106 in response to a user input requesting, or granting permission to send, new account information from an intermediate server 101. In an alternative embodiment, account setup daemon 106 can be launched by an operating system that exists on client device 102. For example, an operating system can launch account setup daemon 106 as a software component independently of an account setup application. More particularly, account setup daemon 106 can be launched by the operating system, in response to being messaged after a user attempts to configure or add an account to client device 102. This attempt to set up an account can result in a message being sent to the operating system by a client application associated with the account, e.g., an email client application, a calendar client application, a preferences pane client application, or any other application executing on client device 102. Alternatively, account setup daemon 106 can be launched by the operating system in response to a push notification delivered to client device 102 from intermediate server 101. For example, a push notification can be generated and sent in response to a change in information stored on intermediate server 101 that may be relevant to client device 102. This change in information may result, as an example, when a user attempts to configure or add an account to client device 104, and the account information related to the account is propagated to intermediate server 101. In an embodiment, although account setup daemon 106 can launch independently of the account setup application, it may still provide notifications to the account setup application. Thus, it will be appreciated that account setup daemon 106 can be launched in numerous manners triggered by numerous events or user actions occurring on either a local system or a remote system.

It will be appreciated that account setup daemon 106 can perform various tasks. For example, account setup daemon 106 can communicate with local active account repository 108 and a local account proxy repository 110. In addition, account setup daemon 106 can communicate with remote servers, such as intermediate server 101. These communications can collect data from, as well as send data to, a storage media, or other location. The term "location" in this context can refer to any entity other than the daemon itself, e.g., it can refer to another client, another server, a data storage medium, a data structure, etc. Thus, the daemon can communicate with entities that are either locally or remotely located.

It will be appreciated that the aforementioned repositories can be stored locally on the same storage medium or on different storage media. Furthermore, the repositories can be part of one or more caches. More particularly, local active account repository 108 referred to throughout this disclosure may be a simplification of what can be a complex process. For example, local active account repository 108 may not be a single repository, but could instead be distributed. That is, accounts may not be stored in a single location, but can be stored in a distributed fashion with an associated software layer that present them to an account setup daemon 106 as if the accounts are available from a single source repository. Application setup daemon 106 can have two-way communication with a location, e.g., read and write, or only one-way communication with a location, e.g., read or write. For example, in an embodiment, the daemon can receive and send data to intermediate server 101, but it can only receive data representing account information from local active account repository 108 and only send data representing account information to local account proxy repository 110.

In an embodiment, intermediate server 101 can be a cloud computing server that includes computer hardware and software specifically designed to provide cloud computing storage, and cloud computing services, to the client device. For example, intermediate server 101 can be a server that provides cloud computing services, such as iCloud from Apple, Inc. Among the services provided by intermediate server 101 can be the storage and communication of account information for various client applications that exist on the client devices.

Referring now to FIG. 2, a table illustrating an implementation of a data structure for storing account information is shown in accordance with an embodiment of the present invention. The implementation can include a key value store (KVS) 201 that allows account information to be stored as a value that can be retrieved with a key. As an example, KVS 201 can be implemented as a hash table. In an embodiment, KVS 201 can include keys 203 relating to client devices, e.g., client devices 102, 104, that are connected with intermediate server 101, and account identifying information for accounts residing on each of those client devices. These keys can be matched to values 205 that provide, for example, account hashes for every account on every client device and both identifying and non-identifying account information for every account on every client device.

By way of example, in an embodiment, KVS 201 can include top level devices key 207 keyed to value 209 providing a universally unique identifier (UUID) for each of the client devices connected with intermediate server 101. KVS 201 can also include device keys 211 for each of the client devices connected with intermediate server 101. Device keys 211 can be keyed to values 213 providing one or more UUID for each account associated with a client device. This UUID can be, for example, an account hash. KVS 201 can include each account hash 215 keyed to a value 217 providing the details of the related account. Each account hash 215 can be a string key combining identity matching information. In an embodiment, the identity matching information of the key can include various account type and account settings information, or other information unique to the identity of the account. For example, account type information can include the service name, e.g., "iCloud", or generic type, e.g., "GenericCardDAV", of the account. The settings information can include such information as the username of the account. It will be appreciated that the account hash can be generated using algorithms that transform known account properties, e.g., username, domain, type, etc., into the account hash. An example of an algorithm that can be used for this purpose is the SHA-1 hash function, although other cryptographic hash functions can be used.

Using the account hash, account setup daemon 106 on one client device can query KVS 201 on intermediate server 101 to collect account information for any account on any client device connected with intermediate server 101. It will be appreciated that KVS 201 used in this process can be specifically designed to communicate with account setup daemon 106 and that intermediate server 101 can support other key value stores that are specific to other client applications and irrelevant to the methods of this disclosure.

Furthermore, KVS 201 represents an embodiment of an implementation for storing account information relevant to multiple user devices, but other means of storing this information in an accessible manner may be contemplated. For example, in an embodiment, client devices in system 100 can send account information provided in the KVS 201 example above to a Web-based Distributed Authoring and Versioning (WebDAV) server used by multiple clients to share information. Alternatively, a client device can act as a primary server in the system, and thus, account information stored locally by one client device can be shared and queried by a second client device networked to the first client device through various forms of communication channels. Therefore, it will be apparent from the disclosure that although an "intermediate server" is referred to throughout, the role of intermediate server 101 can actually be fulfilled by a client device itself.

Figure 3:
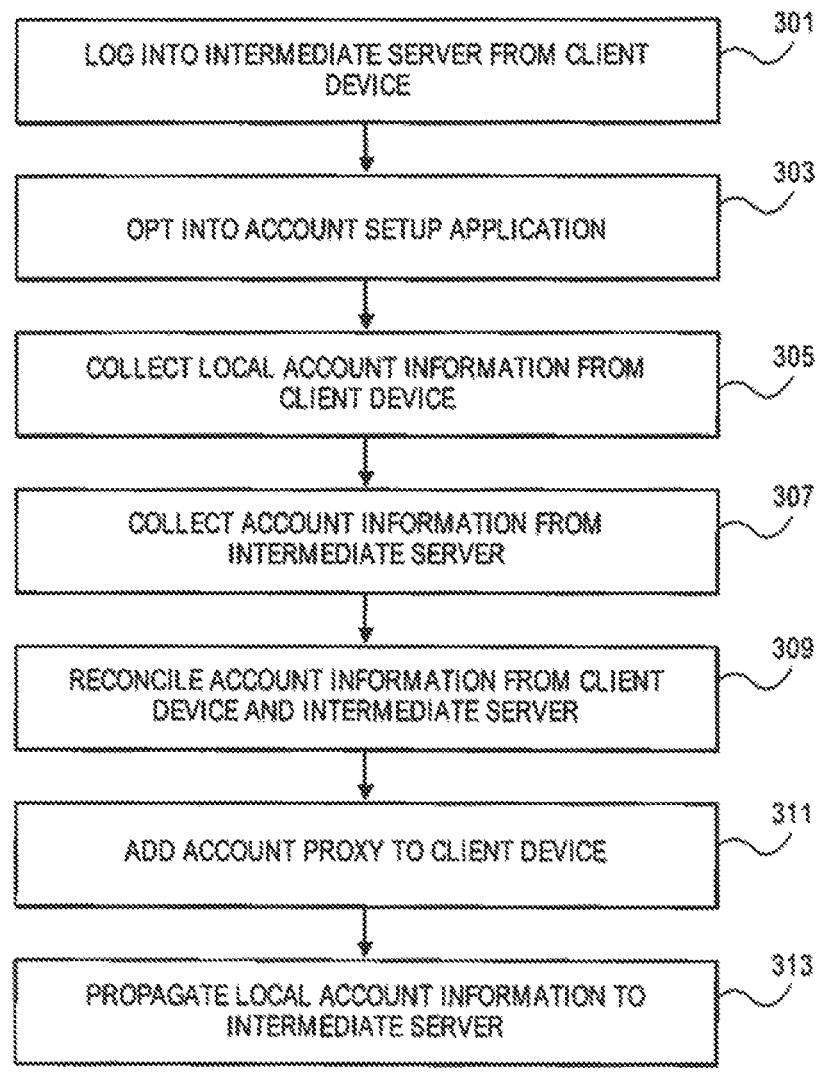
FIG. 3 is a flowchart illustrating a method of setting up an account on a client device in accordance with an embodiment of the present invention.

Referring now to FIG. 3, a flowchart illustrating a method of setting up an account on a client device is shown in accordance with an embodiment of the present invention. In an embodiment, this method can be performed when a user has a collection of accounts, but has not yet accessed intermediate server 101 on client device 102. At operation 301, the user accesses intermediate server 101 using client device 102. This can occur, for example, by logging into a cloud computing service, such as iCloud. This login can also be the first time the server or service has been accessed from client device 102.

At operation 303, the user can provide permission for an account setup application or account setup daemon 106 to be executed on client device 102. The user can be provided with this option as a policy, but it will be appreciated that in alternative embodiments permission from the user may be unnecessary to performing the remainder of the method. Furthermore, operation 303 can be performed before or after accessing intermediate server 101. For example, the account setup application can be opted into during installation of the application, but before contacting the server.

In response to logging into intermediate server 101, the account setup daemon 106 can be launched by the account setup application (or the daemon process can be launched automatically whenever client device 102 is started or booted up, e.g., by the operating system). At 305, account setup daemon 106 communicates with local active account repository 108 in order to collect account information for accounts that already exist locally.

At operation 307, account setup daemon 106 can also communicate with intermediate server 101. For example, account setup daemon 106 can query KVS 201 stored on intermediate server 101 to collect account information. This account information can include accounts that exist on other client devices that are connected with intermediate server 101. For example, a query of KVS 201 by account setup daemon 106 can return account hashes and related values, including account information, for a calendar account or other accounts that exist on another client device, e.g., device 104. For example, account information can include identifying information, as well as non-identifying information, such as version and timestamp, i.e., "system time", information for the account.

After acquiring account information both locally and from intermediate server 101, account setup daemon 106 can perform a reconciliation task at operation 309. Local account information from active account repository 108 can be reconciled with account information from intermediate server 101 by comparing the account hashes to each other. Alternatively, the account hash can be decoded and the identifying information that makes up the account hash can be compared directly. For example, account setup daemon 106 can determine that an account hash retrieved from intermediate server 101 is not also present in active account repository 108. In this case, the account setup daemon 106 can recognize that the associated account does not currently exist on the client device. Alternatively, account setup daemon 106 can find that the same account hash is retrieved from both local active account repository 108 and intermediate server 101. Thus, account setup daemon 106 can conclude that the account already exists on the client device. In this case, account setup daemon 106 may then perform a conflict resolution task to determine which non-identifying information associated with the account hash should be used to update the account information. This conflict resolution task will be described in greater detail below.

At operation 311, after reconciling the account information, account setup daemon 106 can establish an account proxy on client device 102 for any account that was identified on intermediate server 101, that was not also found within local active account repository 108, e.g., for any account that is new to client device 102. The account proxy can be a collection of data that represents an account that is active on a different client device or another server elsewhere in the system. For example, it can be a data structure that holds information relating to a calendar application that resides on client device 104. This account information can include identifying information such as username, account type, account domain, etc., and it can also include non-identifying information such as account settings. This information can be stored in various types of data structures, including as a record or within a hash table, for example. Thus, in an embodiment the account proxy can include all of the information that is required to set up an active account, without actually enabling the account. Therefore, the account proxy can be conceptualized as a disabled account that is added to client device 102. The user can then enable the account proxy to add an account using the techniques described below.

In an embodiment, the addition of account proxies can occur in the background, without notifying the user. For example, on the first login to iCloud, account setup daemon 106 can automatically add account proxies without notifying the user that the proxies are being added. This policy can be used to avoid pestering a user that would prefer to simply visit an account setup interface, e.g., an account preferences pane of an account setup application, to find and activate account proxies, as opposed to being barraged with numerous notifications that must be dealt with individually.

At operation 313, account setup daemon 106 propagates account information from client device 102 to intermediate server 101. This propagation can occur before or after operation 311, but it will be appreciated that performing the operation afterward can permit data relating to the newly added account or account proxy to be propagated as well. Thus, KVS 201 can also be structured to include keyed values related to account proxies on various client devices. The account information can be propagated to KVS 201 and can include keys and values, e.g., account hashes and related non-identifying account information, that are used to update KVS 201 for client device 102. As mentioned above, the account hashes allow for unique identification of the different accounts and are helpful for both identity matching and conflict resolution.

Thus, at a high level, in an instance when the user has not yet, on a client device, logged into iCloud, or other server or service which stores account setup information, but has a collection of accounts on client device 102 and/or other connected client devices, the system can perform the following method. Upon logging into iCloud, the local system of client device 102 can be queried for account information by account setup daemon 106. Next, intermediate server 101 can be queried for account information by account setup daemon 106. The collected account information can be reconciled to determine the set of inconsistent information that should be added to client device 102. Then, the selected set of information can be added to client device 102 to create account proxies, which are initially disabled, for new accounts. It will be appreciated that this information can also be used to update existing account information for enabled accounts. This information can then be relayed to intermediate server 101 to update KVS 201 for future reference by client device 102 or another client device, e.g., 104.

Figure 4:
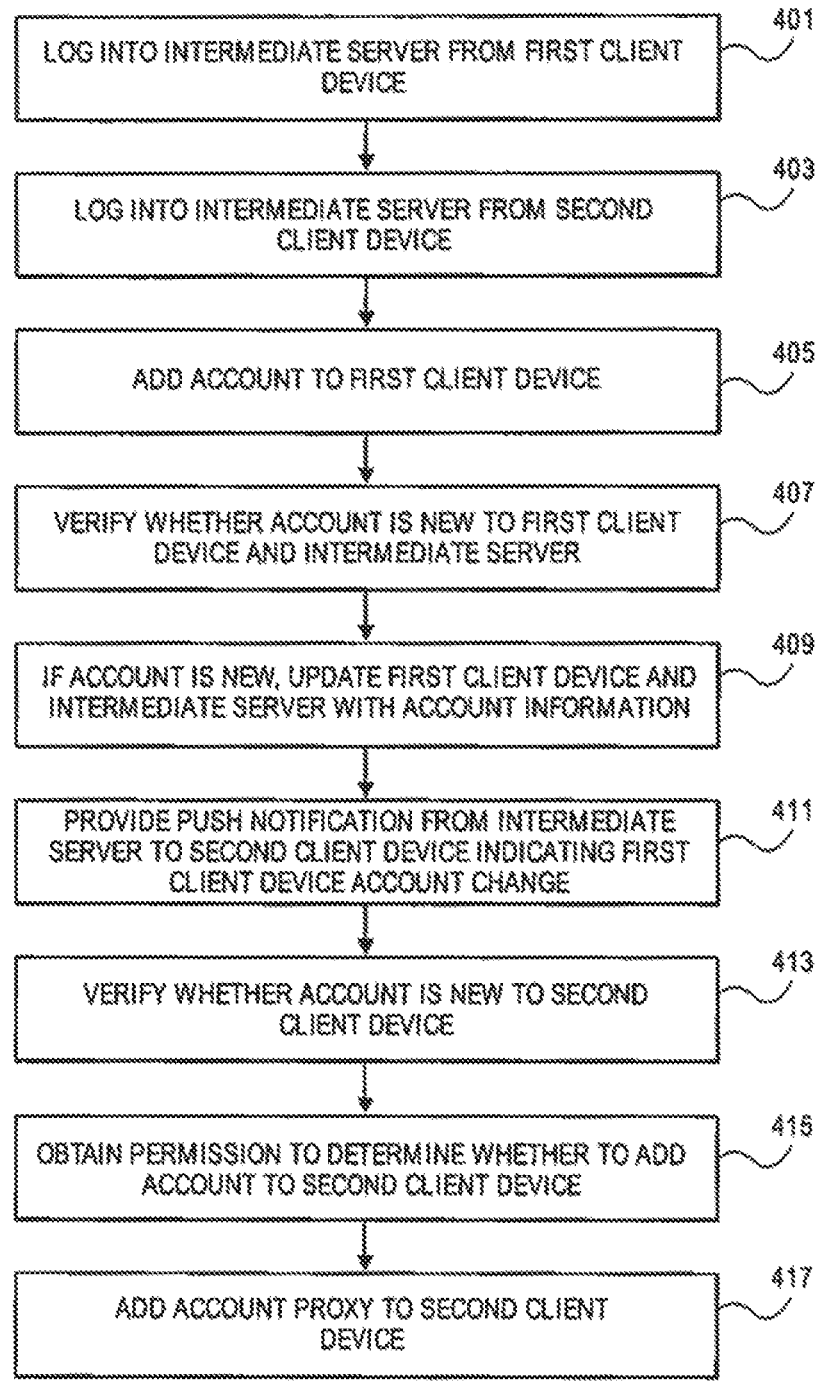
FIG. 4 is a flowchart illustrating a method of setting up an account on a client device in accordance with an embodiment of the present invention.

Referring to FIG. 4, a flowchart illustrating a method of setting up an account on a client device is shown in accordance with an embodiment of the present invention. In an embodiment, this method can be performed when a user has multiple client devices that are connected to intermediate server 101. For example, two client devices, e.g., client devices 102, 104 can have already logged into a cloud computing service at operations 401 and 403 and caused the storage of account setup information for one or more accounts (such as email accounts, calendar accounts, instant messaging accounts, etc.) for each of the client devices 102, 104 on intermediate server 101.

At operation 405, the user adds an account to client device 102. For example, the user can add a lightweight directory access protocol (LDAP) server using an address book client application. This can be considered to have created an account because the client application can reference that server to retrieve user requested information, such as names, phone numbers, etc. However, it will also be understood that "adding an account" does not necessarily imply that the account is new to the first client device. For example, the user may attempt to add an account already present on the first client device by entering appropriate information for adding an account. Therefore, a verification process can be completed to determine whether the added account is new, as described further below. In response to the account addition, the address book client application can message an account setup application to notify it that an account has been added to the local system. In response, the account setup application can launch account setup daemon 106. Alternatively, the address book client can launch account setup daemon 106 directly, or message an operating system to cause the operating system to launch account setup daemon 106.

At operation 407, account setup daemon 106 queries both the client device 102 and intermediate server 101 for account information. For example, it can communicate with one or all of: local account repository 108, local account proxy repository 110, and KVS 201 to collect information related to active accounts and account proxies. The daemon then matches the newly added account information against the collected account information to determine whether the account is actually new to client device 102. Part of this process can involve leveraging a cache that can be maintained on client device 102 to help the daemon determine whether the account to be added is new. This cache can hold existing account information for active accounts and account proxies. Thus, it will be appreciated that the cache can encompass both local active account repository 108 and the local account proxy repository 110.

At operation 409, after determining that the account is new to client device 102, account setup daemon 106 can update client device 102 with the new account and propagate the account information to intermediate server 101. This account information can be propagated in a manner similar to that described above, wherein the account information can be used to update KVS 201. Thus, KVS 201 can change to reflect that client device 102 has added a new account.

At operation 411, the update to KVS 201 prompts the cloud computing service to generate a push notification that can thereafter be sent to client device 104. This push notification indicates that an account has been added to another device that may be relevant to the user and, at operation 413, can also trigger a verification as to whether the account is new to client device 104. More specifically, the notification can lead to activation of an account setup application on client device 104. The activated account setup application can then launch account setup daemon 106 to begin performing processes. At operation 413, account setup daemon 106 collects and reconciles account information in a manner similar to the one described above. The daemon communicates with the local system of client device 104 and intermediate server 101 to collect account information. The account information can then be reconciled by account setup daemon 106 on client device 104.

At operation 415, permission can be requested from the user to determine whether to add the same account, and possibly to actually add the same account, to client device 104. It will be appreciated that this request can be optional, as the following method can be performed even without the user permission. However, such permission can be desirable not only because it provides the user with control and visibility over changes made to client device 104, but also because the addition of the account or account proxy to client device 104 can otherwise go unnoticed by the user, and thus the user would not benefit from its addition.

In an alternative embodiment, rather than requesting permission from the user to determine whether to add the same account, operation 415 can instead verify that permission to add the account already exists. For example, permission may be previously provided to and stored by client device 104 or intermediate server 101. This permission may be from the user or from a computer implemented policy.

In an embodiment, if permission is requested, a user interface, such as a display screen with a query and an accept/reject button, can be presented to the user. In the embodiment, this user interface can be presented to the user when the user first accesses the client application that references the account, after the push notification is received by client device 104. Alternatively, the permission request can be presented immediately to the user, regardless of the client applications that are currently executing. Further still, the permission request can be presented to the user when the user first accesses an account preferences client application, after the push notification is received by client device 104.

At operation 417, if the account newly added to client device 102 is also new to client device 104, account setup daemon 106 can generate an account proxy to simulate a disabled account. In this case, the account proxy would include account information referencing the LDAP server that was newly added to client device 102. Furthermore, intermediate server 101 can optionally be updated with account information indicating that an account proxy has been added to client device 104. The user can then enable the account proxy to add an active account using one or more of the techniques described below.

Having thus described the basic systems and methods of several embodiments, additional disclosure will be provided regarding individual related processes. The features and benefits of these processes will be apparent to one skilled in the art.

In the embodiments disclosed above, reference was made to the reconciliation task that can be performed by account setup daemon 106. Reconciliation involves comparing account information that can be collected from a local system, e.g., client devices 102, 104 and account information that can be collected from intermediate server 101 in order to determine which account information should be used to update the local account information, and potentially the intermediate server account information. Reconciliation can occur on both the local device and the intermediate server, but in an embodiment, the actor for performing the reconciliation exists on the device. This actor can be account setup daemon 106 launched by the account setup application, for example.

The reconciliation process can also involve certain logic that can be required to understand how to appropriately treat the information being gathered. Some accounts can be a bundle of services as opposed to a single service. This can be illustrated by comparing a calendar account for an iCloud user in a calendar application with a contacts account for an iCloud user in a contacts application, where the account may be the same account. Thus, when collecting account information, account setup daemon 106 can gather a single calendar account or an account that shares a bundle of services with other applications. By recognizing the type of account, e.g., individual or bundled, account setup daemon 106 can appropriately match the account information collected from a server against the account information gathered from a local system.

Reference was also made to a conflict resolution task that can be performed by account setup daemon 106. A conflict can occur when there are two or more client devices using the same account, where the account was created or modified with different account information. For example, there can be client device 102 and client device 104, both storing a calendar application. However, a calendar account on client device 102 can be named, e.g., "Home Calendar", by the user and the calendar account on client device 104 can be named, e.g., "Personal Calendar", by the user. In an embodiment, updates to KVS 201 can be atomic, such that only one device will update the account information on KVS 201 associated with the account at any time. In other words, KVS 201 may store the calendar name "Personal Calendar", associated with the account on client device 104, if client device 104 last caused an update to the account information on KVS 201.

To perform conflict resolution, account setup daemon 106 can retrieve values for the account hash key from both the local system of client device 102 and intermediate server 101. For example, the daemon can query the local active account repository 108 of client device 102 and KVS 201 of intermediate server 101. These values can include data representing non-identifying information, such as the user-defined account names "Home Calendar", associated with the account on client device 102, and "Personal Calendar", associated with the account on intermediate server 101. The non-identifying information can also include timestamp information associated with the creation or modification of the account information. Thus, when the returned values differ from one another, the daemon can compare timestamps in the returned values to determine which set of account information is most recent. In an embodiment, the account setup daemon 106 uses a "last writer wins" methodology to resolve conflicts. In this case, the newest set of account information can be determined to be the set of information that the local system and intermediate server should be updated with. Thus, in the example, if the calendar account named "Home Calendar" was updated at 8:00 a.m. and the calendar account named "Personal Calendar" was updated at 8:05 a.m. on the same day, then account information stored on KVS 201 will be used for updates, and the local account information will be updated, e.g., the account name "Home Calendar" will be changed to "Personal Calendar" in the local active account repository 108. On the other hand, if the local account information timestamp was 8:10 a.m., then account setup daemon 106 would propagate the local account information to KVS 201, where the stored value "Personal Calendar" can be replaced by "Home Calendar". The modified KVS 201 account information can subsequently disseminate to other devices connected with intermediate server 101.

In an alternative embodiment, the daemon uses a modified "last writer wins" methodology, in which the newest set of account information can be determined to be the set of information that the local system of client devices 102 and intermediate server 101 should be updated with. However, if the account information was retrieved in response to a client device logging into intermediate server 101 for the first time, then the value retrieved from intermediate server 101 will be selected for active account repository 108, regardless of the relative age of the records.

In one embodiment, conflict resolution acts only on non-identifying account information and not on identifying account information. That is, since identifying account information may be implicit in the account hash, and the account hash may uniquely identify each account, if a person were to modify identifying account information, it would result in a new account hash that will be recognized by the daemon as a new account. However, it will be appreciated that this technique can be modified using additional logic that would allow changes in identifying account information to be recognized as an update to an old account rather than as the creation of a new account.

The systems and methods described above also provide for removal of accounts from local client devices. Referring again to FIG. 2, a table illustrating an implementation of a data structure for storing account information is shown. The table represents an embodiment of KVS 201 where an account represented by the account hash "AccountHash1" can be present on two client devices, e.g., 102, 104, identified by UUIDs "DeviceID1" and "DeviceID2", e.g., 211.

Referring now to FIG. 5, a table illustrating an implementation of a data structure for storing account information is shown in accordance with an embodiment of the present invention. In the event that a user attempts to remove an account from client device 102, which in this example is identified by "DeviceID1", such as by providing user input to delete an active account of a calDAV server, a message can be sent to an account setup application to launch account setup daemon 106. The account setup daemon can then communicate with the local system of client device 102 and intermediate server 101 to provide updates to the account information there.

In an embodiment, upon removing the account from the local system, local account information can be updated by account setup daemon 106 to indicate that the account has been explicitly deleted by the user. Thus, in an embodiment, local account information necessarily includes information that indicates which accounts have been explicitly deleted by user action. Such information can be a primary factor used to determine how to treat an account that is removed and then later added to the system again, or attempted to be added again. More specifically, in at least one embodiment, if an account has been explicitly deleted by a user locally, account setup daemon 106 may prohibit or restrict the addition of the account on the local system again. This can be useful, for example, to prevent a device that has had an account explicitly removed from continuing to present a user with the option to add the account, which may be present on another device connected to the intermediate server.

Furthermore, when an account is removed locally, the account removal can propagate to intermediate server 101 as a modification to KVS 201 such that the account hash for the removed account, i.e., "AccountHash1", would be deleted from the value 502 keyed to the UUID 504 for client device 102, which in this example is identified by "DeviceID1". One benefit of this account removal method is that although KVS 201 can be modified, it need not propagate the account removal to other connected client devices. This is illustrated in FIG. 5 by the removal of "AccountHash1" from the value 502 keyed to the UUID 504, while not removing "AccountHash1" from the value 506 keyed to the UUID 508, which in this example identifies a second client device, e.g., 104.

Thus, you can remove an account from one device without removing the account from a different device or modifying information associated with the different device on the server.

In an alternative embodiment, additional logic can be used to force the removal of the account from all devices when the account is removed from one device. In yet another embodiment, a notification can be sent to other devices that request permission to remove the account from the other device. This can be desirable, for example, if a user wishes to have a reminder notification sent to all devices whenever an account is removed from one device. Thus, a useful aspect of the systems and methods described above is the flexibility provided in setting up and removing accounts on multiple devices.

It will be appreciated that in alternative embodiments, removal or deletion from a client device can simply refer to hiding account information from the user. For example, rather than deleting account information from active account repository 108 or account proxy repository 110 on client device 102 in response to a user input to remove an account, client device 102 can simply remove icon references to the account from client applications such as an account preferences pane of an account setup application. Thus, the account information can be retained within a cache to allow for future reference by account setup daemon 106. Likewise, removal of an account from client device 102 may only result in KVS 201 updating the keyed values corresponding to client device 102 in a manner that suggests the account information has merely been hidden, as opposed to deleted.

In an embodiment, the systems and methods in this disclosure employ a garbage collection technique to remove accounts from KVS 201. Referring again to FIG. 2, a table illustrating an implementation of a data structure for storing account information is shown. This table represents an embodiment of KVS 201 where an account represented by the account hash "AccountHash1" can be present on two client devices, e.g., 102, 104, identified by UUIDs "DeviceID1" and "DeviceID2", e.g., 211. In an embodiment, removal of the account from both devices can result not only in an update to KVS 201 that removes the "AccountHash1" identifier from the value 213 keyed to the UUID of both devices, but it also removes the account hash, and thus the account, entirely from intermediate server 101.

Referring now to FIG. 6, a table illustrating an implementation of a data structure for storing account information is shown in accordance with an embodiment of the present invention. This illustrates an embodiment of KVS 201 after "AccountHash1" has been removed from both "DeviceID1" and "DeviceID2". In contrast to the representation of KVS 201 shown prior to removal in FIG. 2, the account hash for the removed account no longer exists in KVS 201 as a key 215, or as part of value 213. As a result, new devices that connect with intermediate server 101 may not be notified that the account is available for addition to their local systems. Thus, the garbage collection technique used to remove accounts can reduce the size of KVS 201 and prevent inaccurately notifying devices that account information is available for local addition.

Nonetheless, it will be appreciated that a device can subsequently add the same account that was removed from KVS 201. The device may be one of the same devices that removed the account, or it may be another device. When another device, e.g., other than 102, 104, adds the same account that was removed and connects with intermediate server 101, the device and account can be recognized as being new to KVS 201 and device, account hash, and account information for the device can be stored in KVS 201. It will be appreciated however that in an embodiment, the same device that removed the account can add the account again. In spite of account information recognizing the account as having been explicitly removed from the device, such as described above, account setup daemon 106 can permit the device to re-add the account to the device. This permission may be granted, for example, where the attempt to re-add the account is initiated locally by the user, as opposed to being initiated remotely by a notification from the intermediate server. Thus, in this case, the account hash for the re-added account can be added to the value keyed to the existing device keys of KVS 201 and a new account information value can be added to KVS 201, keyed to the account hash.

The flexibility of these systems and methods is further illustrated by the ability of KVS 201 to regenerate. More particularly, in an embodiment, KVS 201 is able to regenerate information for devices that have previously been removed from KVS 201. Removal of devices and related information from KVS 201 can occur under numerous circumstances. For example, under some circumstances, information relating to a device may be automatically deleted or excluded from consideration in KVS 201 in response to an event or condition. One example of such an event can be the lapse of a predetermined amount of time since a device last connected with intermediate server 101. Under this circumstance, KVS 201 can recognize the device as being "aged-out". It is trivial to implement a scheme where each device and/or KVS 201 records when the device last connected to intermediate server 101.

Therefore, KVS 201 can delete information related to a device that has "aged-out". Referring again to FIG. 2, a table illustrating an implementation of a data structure for storing account information is shown. Referring now to FIG. 7, a table illustrating the same data structure is shown after client device 102, here represented by "DeviceID1", has aged-out. Client device 102 may have aged-out, for example, because it was temporarily misplaced by the user, and therefore did not connect with intermediate server 101 within a predefined period of time, e.g., one month. As a result, KVS 201 can remove "DeviceID1" from value 209 of KVS 201. Furthermore, "DeviceID1" can be removed from devices key 211 of KVS 201. It will be appreciated that in an embodiment, information related to the device may not actually be deleted from KVS 201, but it may instead be hidden, or marked to be excluded, or otherwise excluded from consideration by queries from account setup daemon 106 running on the removed device or another device.

Thus, any client device could safely delete the information associated with the aged-out device without affecting the information stored in KVS 201. For example, account setup daemon 106 on another client device, e.g., device 104, could remove account information from active proxy repository 110 without impacting the data structure of KVS 201. Furthermore, the garbage collection scheme described above can remove the accounts that only appear on the aged-out device. For example, if client device 102 represented by "DeviceID1" was the only device having a particular email account associated with it, upon aging-out, the garbage collection scheme can cause KVS 201 to remove the account hash related to the email account and the value keyed to the account hash.

Thereafter, regeneration can occur when client device 102 connects with intermediate server 101 again, after aging-out. For example, if the user discovers where client device 102 was misplaced and reconnects to the internet after several months, a variety of options can be presented. In an embodiment, an option to add the aged-out device as though it was never excluded may be presented to the user through an account setup application, and the device, as well as the accounts associated with the device, can be regenerated on KVS 201. Regeneration on KVS 201 can include adding previously deleted information or showing previously excluded information. Alternatively, an option to treat the accounts appearing only on the "aged-out" device as "stale" can be presented to the user through an account setup application. In this case, these accounts can either be deleted or turned into disabled proxy accounts on client device 102, with KVS 201 being updated appropriately.

In an aspect of the regeneration scheme described above, regeneration is flexible enough to allow for all of the data in KVS 201 to be deleted with a single operation. Even in this case, as each device that was previously connected with KVS 201 checks back into intermediate server 101, the device keys, account lists, account hashes, and individual account information associated with the devices can be automatically added to KVS 201. Thus, even when KVS 201 has been deleted with a single operation, it can be seamlessly rebuilt with little or no user intervention.

Therefore, KVS 201 provides a flexible means of storing account information that can be shared between client devices to allow quick account setup and updates. Advantageously, KVS 201 can allow accounts to be freely added and removed from any client device without interfering with the arrangement of another client device. Furthermore, KVS 201 can be regenerative, making it safe to delete the details of any given device from KVS 201, since KVS 201 can reconstruct such information without user input, and indeed, without the user even noticing that the data was ever removed from KVS 201. In essence, KVS 201 acts as an account hub that effortlessly propagates accounts and account information to any user device.

FIGS. 8 through 11 illustrate a graphical user interface (GUI) through which a user can set up or add an account on a client device according to an embodiment of the present invention. For example, this GUI can be an interface provided by an account setup application. The screenshots correlate with an embodiment of displays that can be presented to a user when a user has a collection of accounts, but has not yet accessed the intermediate server on the client device. Therefore, the screenshots correlate with the displays that are presented to the user during performance of the method shown in FIG. 3. However, it will be appreciated that the principles taught can be extended to other embodiments of systems and methods, such as the embodiment mentioned above with respect to FIG. 4, and any other embodiments that can be considered to be within the scope of the disclosure.

Figure 8:
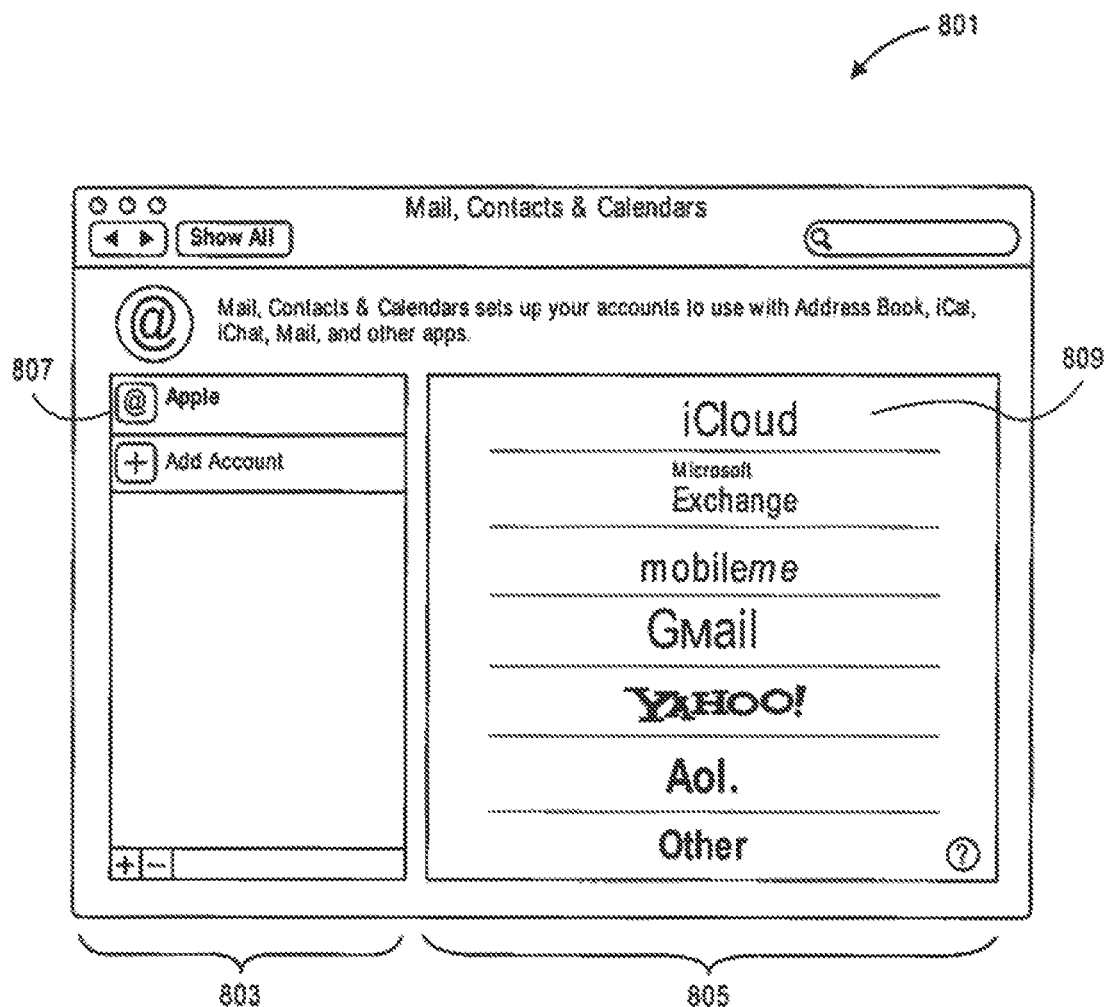
FIG. 8 shows a graphical user interface (GUI) through which a user can set up an account on a client device in accordance with an embodiment of the present invention.

Referring now to FIG. 8, a graphical user interface (GUI) through which a user can set up an account on a client device is shown in accordance with an embodiment of the present invention. The user can be presented with display 801 when logged into and using an account setup application on client device 102. Here, display 801 includes a pane that presents and allows user manipulation of account settings and preferences. This pane can be referred to as an "accounts preferences pane". The display includes left column 803 identifying accounts that currently exist on a client device, which are visible to the user. The display also includes right column 805 identifying various servers that act as repositories for account data and information, which can also provide individual services, such as mail, calendar or contacts. As shown, client device 102 currently has a single account 807 configured for a mail client application, named "Apple".

Figure 9:
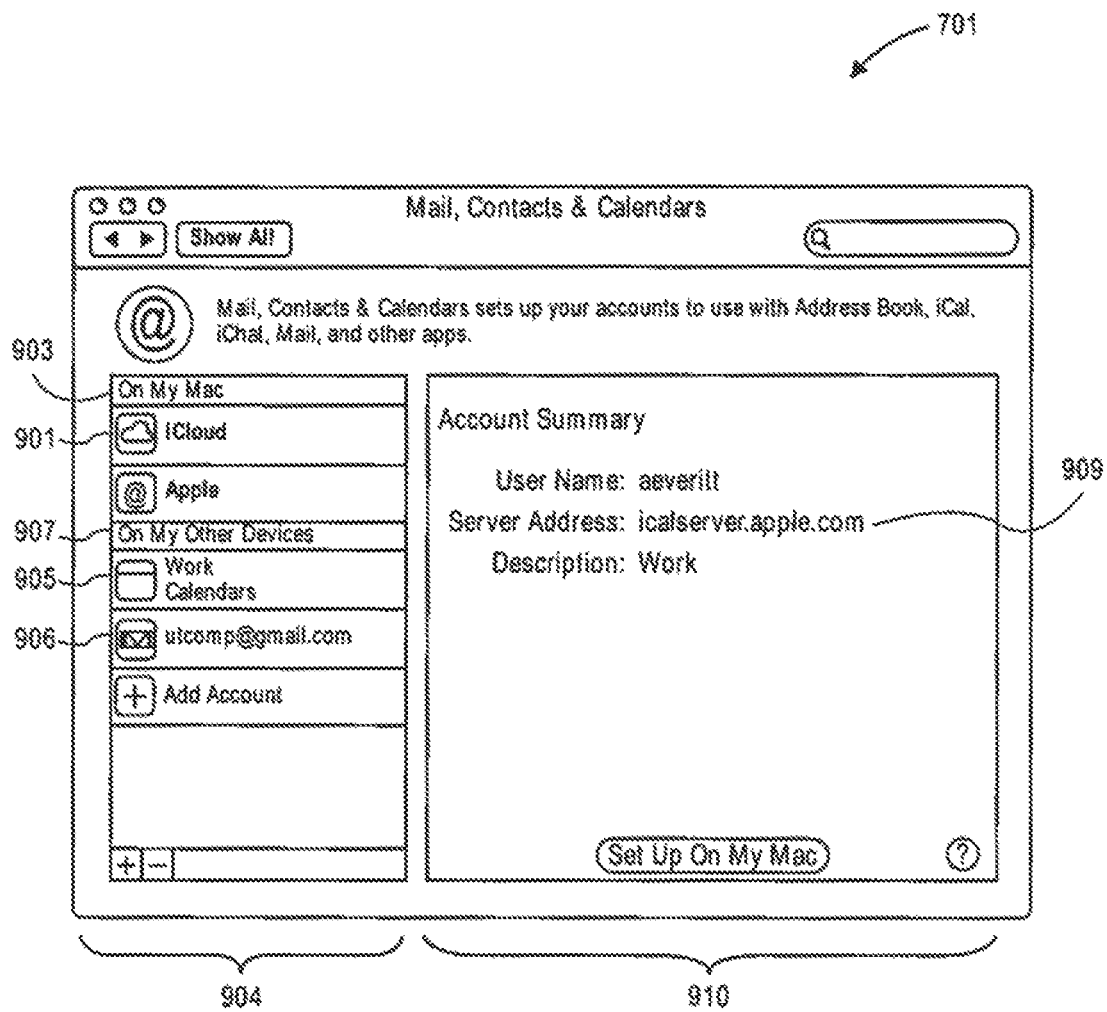
FIG. 9 shows a GUI presented to a user after the user has accessed an intermediate server in accordance with an embodiment of the present invention.

Referring now to FIG. 9, a GUI presented to a user after the user has accessed an intermediate server is shown in accordance with an embodiment of the present invention. A user has signed into one of the servers or services through the accounts preferences pane. This sign-in can be made, for example, by selecting the iCloud icon 809 in right column 805 of FIG. 8. The selection can in turn log the user into the iCloud account. Thus, after selecting icon 809, the user has accessed an intermediate server, e.g., 101. After logging into the iCloud account, the methods described above take place, including collection and reconciliation of account information, which results in the addition and display of active local accounts. For example, the account associated with a contacts application of the iCloud service was recognized and added to client device 102 as a result of the client logging into iCloud. This account can be represented by an opaque icon 901 under a grouping 903 in left column 904 that identifies the account as existing within client device 102, e.g., within active accounts repository 108. Therefore, in an embodiment, opaque icons are used to indicate currently enabled accounts residing on a local system.

Additionally, after logging into the iCloud account, the methods described above take place, including collection and reconciliation of account information, which results in the addition and display of account proxies for accounts that are located on the intermediate server. In this embodiment, intermediate server 101 provides the iCloud service. Here, those account proxies are represented by a slightly transparent icon, e.g., icon 905 indicating an account with a calendar application named "Work" and icon 906 indicating an account with a mail application named "utcomp@gmail.com". The account proxies are initially disabled accounts which may not function without first receiving an activation command. These account representations are shown under a grouping 907 that identifies them as accounts that are on other client devices of the user. Thus, in an embodiment, dimmed or semi-transparent icons show disabled accounts on the local system.

It will be appreciated that the added active accounts and account proxies can relate to individual services, such as a single email account or to a bundle of services, such as email, contacts, and calendar services bundled under a single account. Thus, as shown in FIG. 8, in response to a user selection of an account proxy, e.g., icon 905, a read-only account summary 909 can be displayed in the right column 910 that identifies the selected account proxy as a single calendar account.

Figure 10:
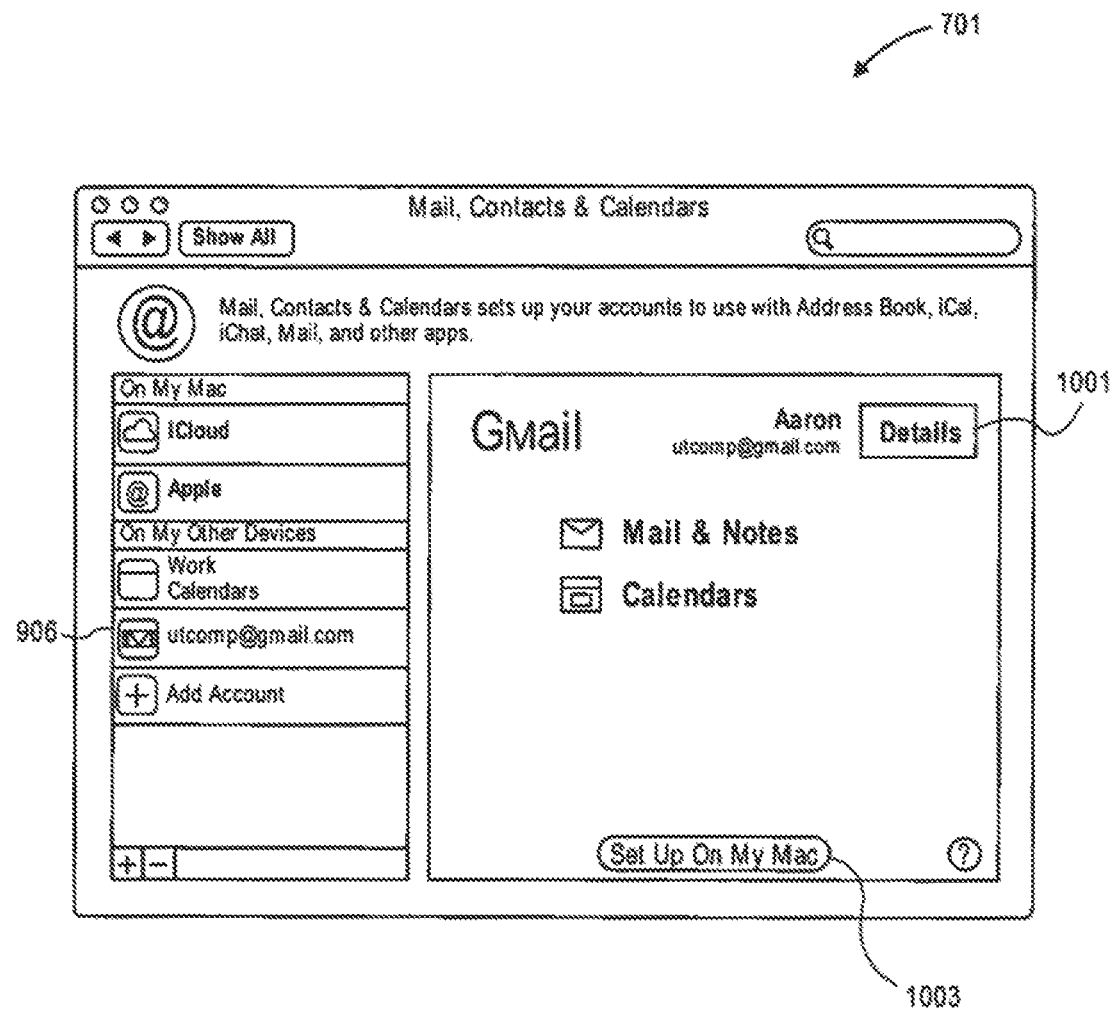
FIG. 10 shows a GUI presented to a user after the user has selected an account proxy in accordance with an embodiment of the present invention.

Referring to FIG. 10, a GUI presented to a user after the user has selected an account proxy is shown in accordance with an embodiment of the present invention. In response to a user selection of another account proxy, e.g., icon 906, a read-only account summary 1001 can be displayed that identifies the selected account proxy as an account for a collection of services.

The account summary 909, 1001 can include both identifying and non-identifying account information, such as the user name, server address, or description of the account. The user can also be presented with a control element, such as a display icon, that allows the user to enable an account proxy into an active account on the client device. An example of such an icon can be illustrated by the "Set Up On My Mac" button 1003 near the bottom of the right column. Thus, it will be appreciated that a user input selecting button 1003 can enable the account shown in account summary 1001.

Figure 11:
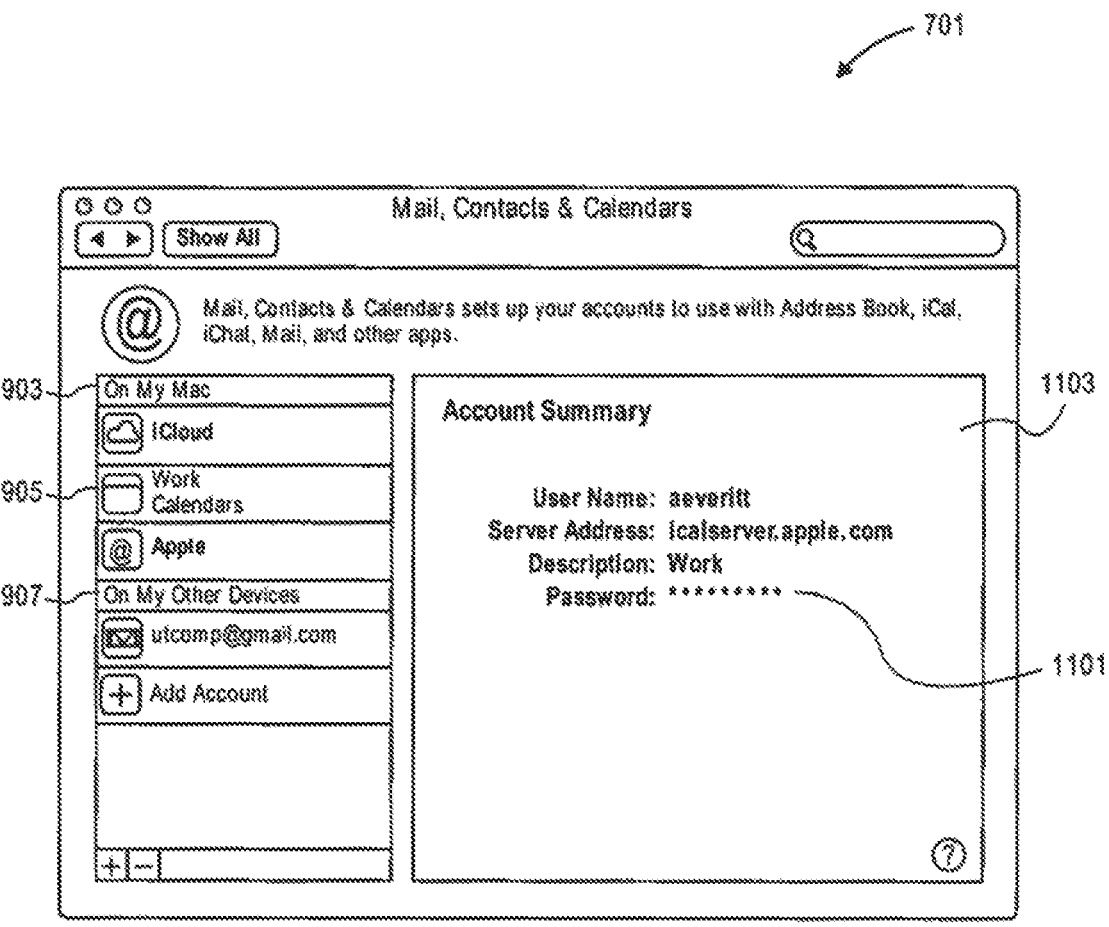
FIG. 11 shows a GUI presented to a user after the user has selected an account proxy in accordance with an embodiment of the present invention.

Referring to FIG. 11, a GUI presented to a user after the user has selected an account proxy is shown in accordance with an embodiment of the present invention. Selection of the control to enable an account proxy can result in the initiation of the account setup process. If the account setup process is successful, the account proxy can become an active account. After enablement, the account icon 905 can be promoted from the grouping 907 of account proxies to the grouping 903 of enabled accounts.

In an embodiment, in order to complete the account setup process, a password can be required for many accounts. Referring again to FIG. 10 as an example, completing the setup process for the "Work" account may require that a password 1101 be supplied in account summary portion 1103 of the display screen. It can be contemplated that password management can be accomplished in at least two ways. First, account passwords can be supplied manually by the user during the account setup process. Thus, account setup would require that the user select an account, e.g., select the "Set Up On My Mac" button 1003, and enter a password 1101. Alternatively, passwords can be automatically loaded with other account information. This loading can occur during the addition of an account proxy. Thus, the account setup process would only require that a user select an account and the "Set Up On My Mac" button 1003. In either case, it will be appreciated that the systems and methods described above provide a user experience for quickly and easily setting up accounts on a client device that requires minimal user input.

Figure 12:
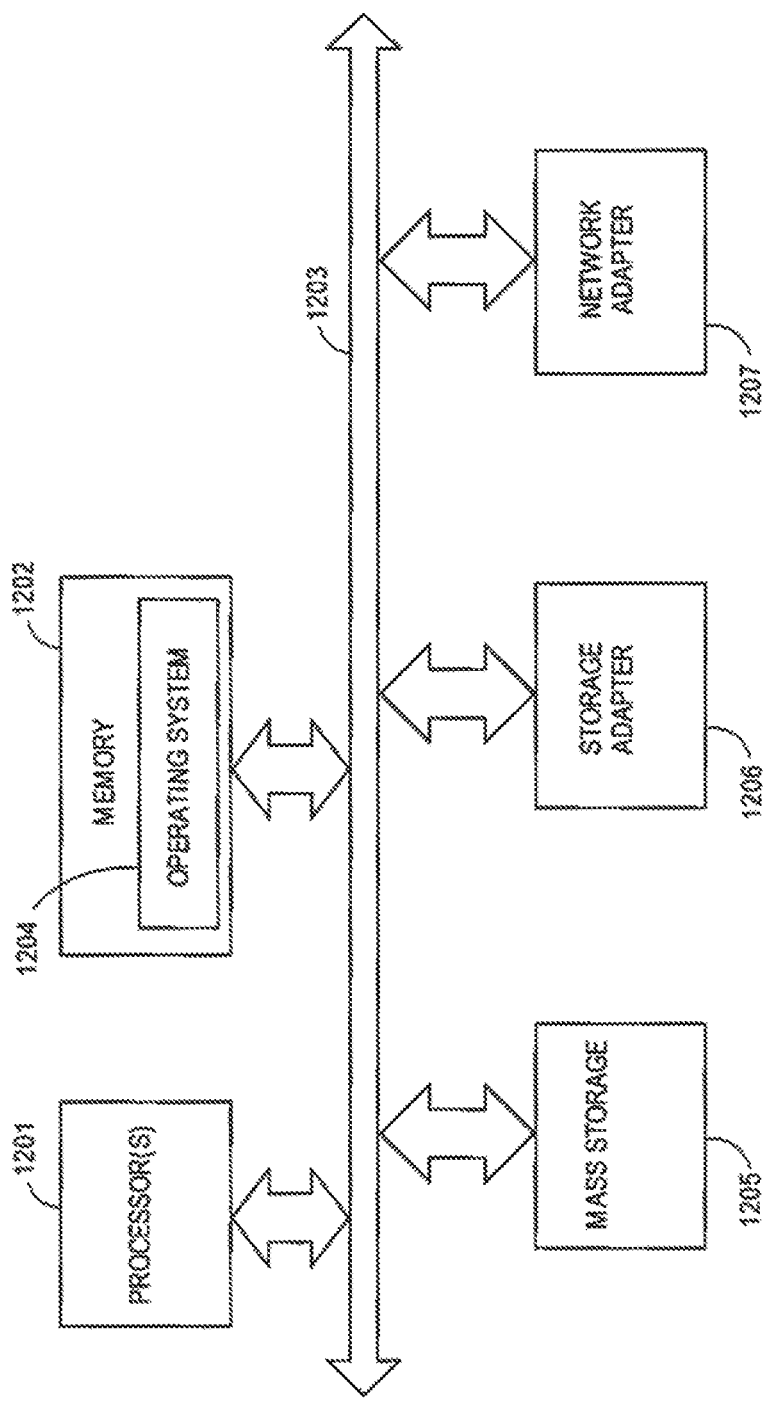
FIG. 12 is a high level block diagram illustrating a processing system which can be employed to perform methods in accordance with an embodiment of the present invention.

Referring to FIG. 12, a high level block diagram illustrating a processing system is shown in accordance with an embodiment of the present invention. The client devices or servers described in the present application can be embodied by such a processing system. Furthermore, such a processing system can implement the account setup application and daemon referred to above. Certain standard and well-known components which are not germane to the present invention are not shown. The processing system includes one or more processors 1201 coupled to a bus system 1203.

The bus system 1203 is an abstraction that represents any one or more separate physical buses and/or point-to-point connections, connected by appropriate bridges, adapters and/or controllers. The bus system 1203, therefore, can include, for example, a system bus, a form of Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

The processors 1201 are the central processing units (CPUs) of the processing system and, thus, control the overall operation of processing system. In certain embodiments, the processors 1201 accomplish this by executing software stored in memory 1202. A processor 1201 can be, or can include, one or more programmable general-purpose or special-purpose microprocessors, digital signal processors (DSPs), programmable controllers, application specific integrated circuits (ASICs), field programmable gate arrays (FPGAs), programmable logic devices (PLDs), or the like, or a combination of such devices.

The processing system also includes memory 1202 coupled to the bus system 1203. The memory 1202 represents any form of random access memory (RAM), read-only memory (ROM), flash memory, or a combination thereof. Memory 1202 stores, among other things, the operating system 1204 of the processing system.

Also connected to the processors 1201 through the bus system 1203 are a mass storage device 1205, a storage adapter 1206, and a network adapter 1207. Mass storage device 1205 can be or include any conventional medium for storing large quantities of data in a non-volatile manner, such as one or more disks. The storage adapter 1206 allows the processing system to access external storage systems. The network adapter 1207 provides the processing system with the ability to communicate with remote devices and can be, for example, an Ethernet adapter or a Fibre Channel adapter.

Memory 1202 and mass storage device 1205 store software instructions and/or data, which can include instructions and/or data used to implement the techniques introduced here. The system can include other components (e.g. input devices, such as a mouse and keyboard, and output devices such as a display).

Software to implement the technique introduced here can be stored on a machine-readable medium. A "machine-accessible medium," as the term is used herein, includes any mechanism, i.e., a non-transitory storage medium which stores information in a form accessible by a machine (e.g. a computer, manufacturing tool, any device with one or more processors, etc.). For example, a machine-accessible medium includes recordable/non-recordable media (e.g. read-only memory (ROM); random access memory (RAM); magnetic disk storage media; optical storage media; flash memory devices; etc.), etc.

The appendix of this disclosure includes some specific policy recommendations for operations that can be performed by an account setup daemon 106 in accordance with an embodiment. More specifically, the policy recommendations include, e.g., policies for account identity matching, account modification, and account deletion operations, which will be understood by one skilled in the art. However, it will be appreciated that these policy recommendations are not the only viable policies, and indeed, one skilled in the art may contemplate additional policy recommendations for operations that are within the scope of this disclosure.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. As an example, various data structures are referred to throughout the specification, such as key-value stores and account-hashes, which can be replaced or augmented with other data structures, such as dictionary files or paired hash-tables. One skilled in the art may contemplate these and other alternatives, and thus, the embodiments provided herein are intended to be exemplary, and not limiting.

APPENDIX

KV-Store Identifier com. apple. accounts
Top Level Devices Key

APPENDIX-continued

```
Key: Devices
<array>
        <string>{DEVICE UUID}</string>
        <string> </string>
</array>
Device Keys
```

```
Key: {DEVICE UUID}
<dict>
        <key>Accounts</key>
        <array>
                <key> {ACCOUNT UUID} </key>
        </array>
        <key>LastSeen</key>
        <date>{SYSTEM TIME}</date>
        <key>DisplayName</key>
        <string> ... </string>
        <key>DeviceModel</key>
        <string> ... </string>
        <key>Version</key>
        <string>1.0</string>
</dict>
Account Keys
```

All other top-level keys correspond to a single account, and should be ignored if not present in the devices key corresponding to a compatible version. The goal for A-List accounts should be to upload only 1 account.
```
Key: {ACCOUNT UUID}
<dict>
        <key>AccountType</key>
        <string>{ACCOUNT TYPE}</string>
        <key>Settings</key>
        <dict>{ACCOUNT SETTINGS}</dict>
        <key>Version</key>
        <string>1.0</string>
        <key>LastUpdated</key>
        <date>{SYSTEM TIME}</date>
</dict>
{ACCOUNT UUID}
```

Account UUID is generated for each account added and does not map to a UUID on the client.
{ACCOUNT TYPE}

One of:
| Service | Generic |
|---|---|
| iCloud | GenericCardDAV |
| Exchange | GenericCalDAV |
| MobileMe | GenericJabber |
| Gmail | GenericIMAP |
| Yahoo | GenericPOP |
| AOL | GenericLDAP |

{ACCOUNT SETTINGS}

The following fields are common to all account types:
LoginName     <string>
Description   <string>
Shared settings fields for Exchange,MobileMe,GMail,Yahoo,AOL:
FullName      <string>
Shared settings fields for GenericJabber:
Optional:
ServerAddress     <string>
Port              <number>
UseSSL            <bool>
UseKerberos       <bool>
Shared settings fields for GenericCalDAV:
ServerAddress     <string>
Optional:
ServerPath        <string>
Port              <number>
UseSSL            <bool>
UseKerberos       <bool>
Shared settings fields for GenericCardDAV:
ServerAddress     <string>
Optional:
Port              <number>
UseSSL            <bool>
Shared settings fields for GenericLDAP:
ServerAddress     <string>

APPENDIX-continued

```
Port                <number>
UseSSL              <bool>
SearchBase          <string>
Scope               <string>
UseAuthentication   <bool>
Shared settings fields for GenericIMAP:
FullName            <string>
EmailAddress        <string>
    Optional:
            <dict>
Shared settings fields for Generic POP:
FullName
    Optional:
            <dict>
```
Identity Matching Accounts are considered an identity match if the following set of properties are equal:
-AccountType AND LoginName AND (IF EXISTS)ServerAddress AND (IF EXISTS) SearchBase
Account Modification Criteria If a local account and one in the cloud identity match, and the local account is a pure super set of the account in the cloud, then add the additional keys.
Account Addition Criteria For each local account, if no account in the cloud identity matches, then add a new account to the cloud, and add a reference to the devices key.
If at least one account in the cloud identity matches, but is NOT a superset of any of the matched accounts, then add a new account and a reference in the devices key.
Account Deletion Criteria If an account referenced by your device is not identity matched by any account on your device, then remove the reference.
Displaying Accounts Sort first by Account type table (consistent with local accounts), and then by date (temporal locality).

What is claimed is:

1. A non-transitory machine readable storage medium containing executable instructions which when executed by a data processing system cause the data processing system to perform a method, the method comprising:
    storing, on a server, a first account information associated with an account, wherein the account is enabled on a first client device;
    storing, on the server, a second account information associated with the account, wherein the account is enabled on a second client device, the enabled account on the first device is synchronized on the enabled account on the second device, and wherein the second account information matches the first account information; and
    removing the first account information from the server, in response to the account being removed from the first client device, without removing the second account information.

2. The non-transitory machine readable storage medium of claim 1, wherein the account being removed from the first client device comprises deleting the account.

3. The non-transitory machine readable storage medium of claim 1, wherein the account being removed from the first client device comprises hiding the account.

4. The non-transitory machine readable storage medium of claim 1, wherein the server is a cloud computing server configured to provide cloud computing services to the first client device and the second client device.

5. The non-transitory machine readable storage medium of claim 1, wherein the first account information and the second account information are stored in a key value store on the server.

6. The non-transitory machine readable storage medium of claim 5, wherein the first account information is a value keyed to the first client device and the second account information is a value keyed to the second client device, wherein the values comprise account hashes, and wherein the account hashes comprise an identity matching key portion.

7. The non-transitory machine readable storage medium of claim 6, wherein the identity matching key portion includes username and account type information.

8. A machine implemented method, the method comprising:
    storing, on a server, a first account information associated with an account, wherein the account is enabled on a first client device;
    storing, on the server, a second account information associated with the account, wherein the account is enabled on a second client device, the enabled account on the first device is synchronized on the enabled account on the second device, and wherein the second account information matches the first account information; and
    removing the first account information from the server, in response to the account being removed from the first client device, without removing the second account information.

9. The method of claim 8, wherein the account being removed from the first client device comprises deleting the account.

10. The method of claim 8, wherein the account being removed from the first client device comprises hiding the account.

11. The method of claim 8, wherein the server is a cloud computing server configured to provide cloud computing services to the first client device and the second client device.

12. The method of claim 8, wherein the first account information and the second account information are stored in a key value store on the server.

13. The method of claim 12, wherein the first account information is a value keyed to the first client device and the second account information is a value keyed to the second client device, wherein the values comprise account hashes, and wherein the account hashes comprise an identity matching key portion.

14. The method of claim 13, wherein the identity matching key portion includes username and account type information.

* * * * *